(12) United States Patent
Cox

(10) Patent No.: US 6,378,748 B1
(45) Date of Patent: Apr. 30, 2002

(54) CARRIER AND CARRIER SYSTEM FOR VEHICLE

(76) Inventor: Larry E. Cox, 9608 Northland Dr., Stanwood, MI (US) 49346

( * ) Notice: Subject to any disclaimer, the term of this patent is extended or adjusted under 35 U.S.C. 154(b) by 0 days.

(21) Appl. No.: 09/332,401

(22) Filed: Jun. 14, 1999

(51) Int. Cl.[7] .................................................. B60R 9/06
(52) U.S. Cl. ...................... 224/511; 224/401; 224/492; 224/505; 224/521; 224/524; 224/527
(58) Field of Search ................................ 224/401, 488, 224/492, 494, 502–509, 511, 512, 513, 518–532, 42.21

(56) References Cited

U.S. PATENT DOCUMENTS

| | | | | |
|---|---|---|---|---|
| 1,600,335 A | * | 9/1926 | Indahl | 224/507 |
| 1,718,205 A | * | 6/1929 | McNear | 224/524 X |
| 3,260,929 A | * | 7/1966 | Hedgepeth | 224/492 |
| 3,650,443 A | * | 3/1972 | Haskett et al. | 224/528 X |
| 4,084,736 A | * | 4/1978 | Jacobs, Jr. | 224/492 X |
| 4,247,030 A | | 1/1981 | Amacker | 224/273 |
| 4,277,008 A | | 7/1981 | McCleary | 224/273 |
| 4,300,706 A | | 11/1981 | Hendrick et al. | 224/31 |
| 4,301,955 A | * | 11/1981 | DeFever | 224/401 |
| 4,410,117 A | * | 10/1983 | Crawford et al. | 224/42.21 X |
| 4,770,440 A | * | 9/1988 | Lander | 224/401 X |
| 4,826,057 A | | 5/1989 | Yamada | 224/32 |
| 5,018,651 A | * | 5/1991 | Hull et al. | 224/521 X |
| 5,029,740 A | * | 7/1991 | Cox | 224/504 X |
| 5,096,102 A | * | 3/1992 | Tolson | 224/523 X |
| 5,190,195 A | * | 3/1993 | Fullhart et al. | 224/519 X |
| 5,232,005 A | * | 8/1993 | Mitchell | 224/401 X |
| 5,236,062 A | * | 8/1993 | Laney | 224/401 X |
| 5,360,259 A | | 11/1994 | Lemberger | 298/19 |
| 5,497,927 A | * | 3/1996 | Peterson | 224/519 |
| 5,676,292 A | * | 10/1997 | Miller | 224/502 X |
| 5,680,975 A | * | 10/1997 | Stapleton | 224/519 |

* cited by examiner

*Primary Examiner*—Gregory M. Vidovich
(74) *Attorney, Agent, or Firm*—Lon H. Romanski

(57) ABSTRACT

A carrier system for an associated vehicle is shown having mounting structure for mounting the carrier system to the vehicle; the carrier system is shown with a coupler which is effective for in turn connecting to various cargo carrying apparatus.

14 Claims, 8 Drawing Sheets

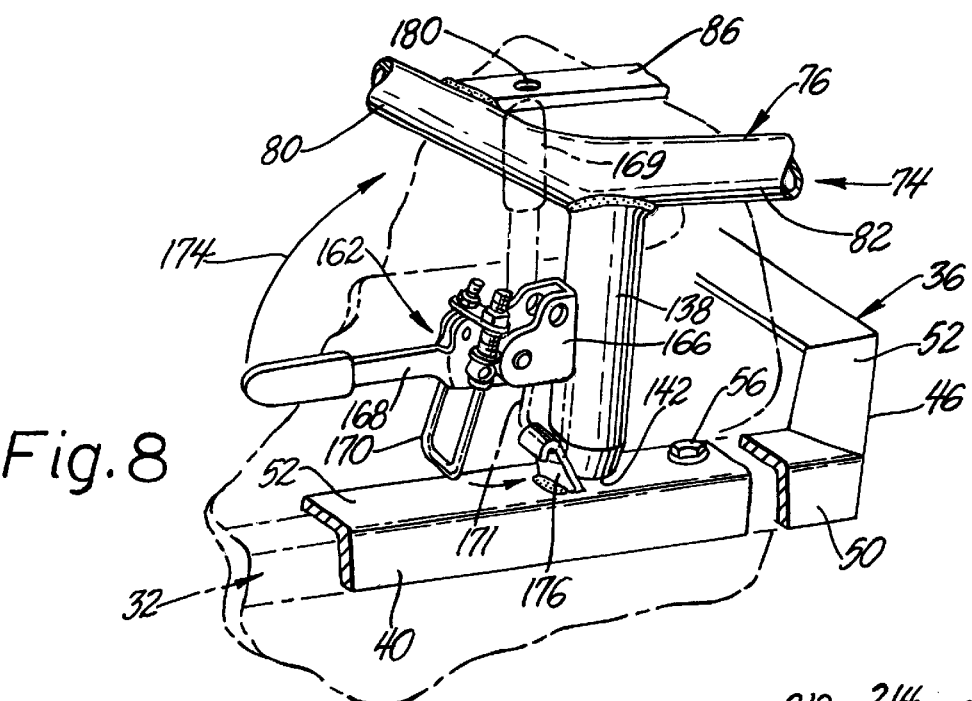
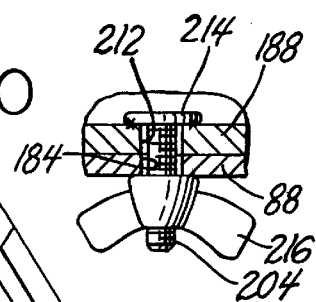
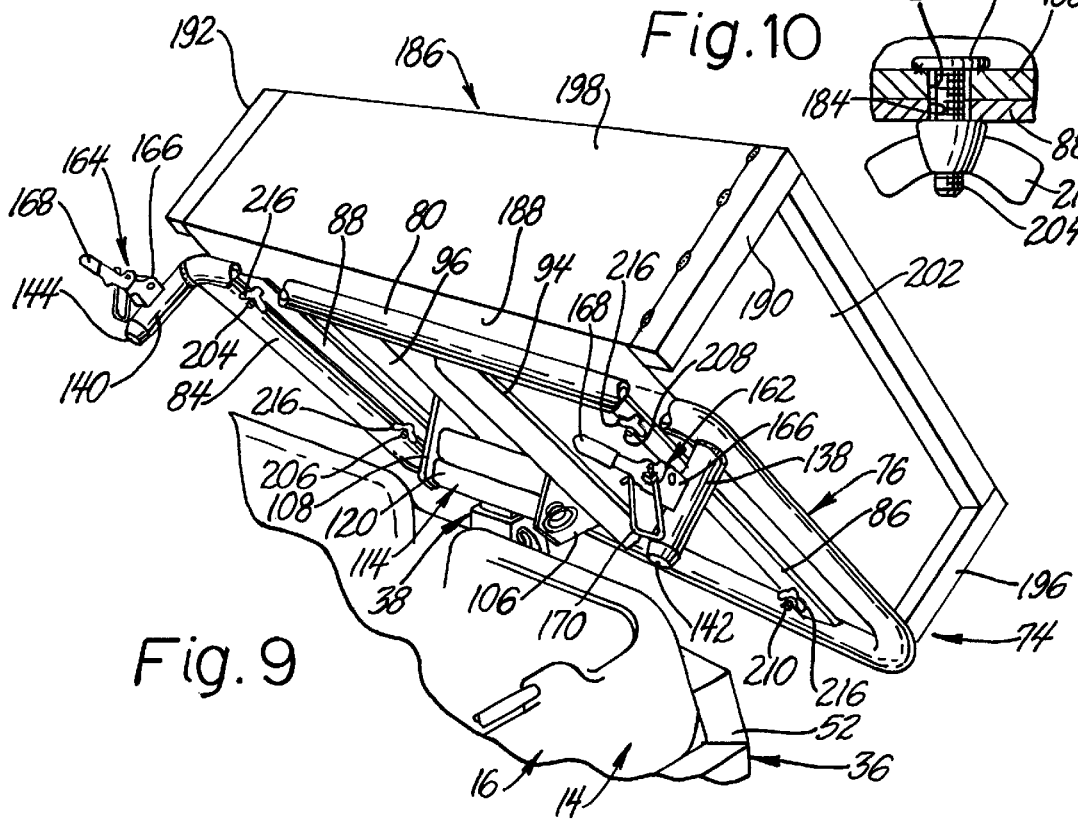

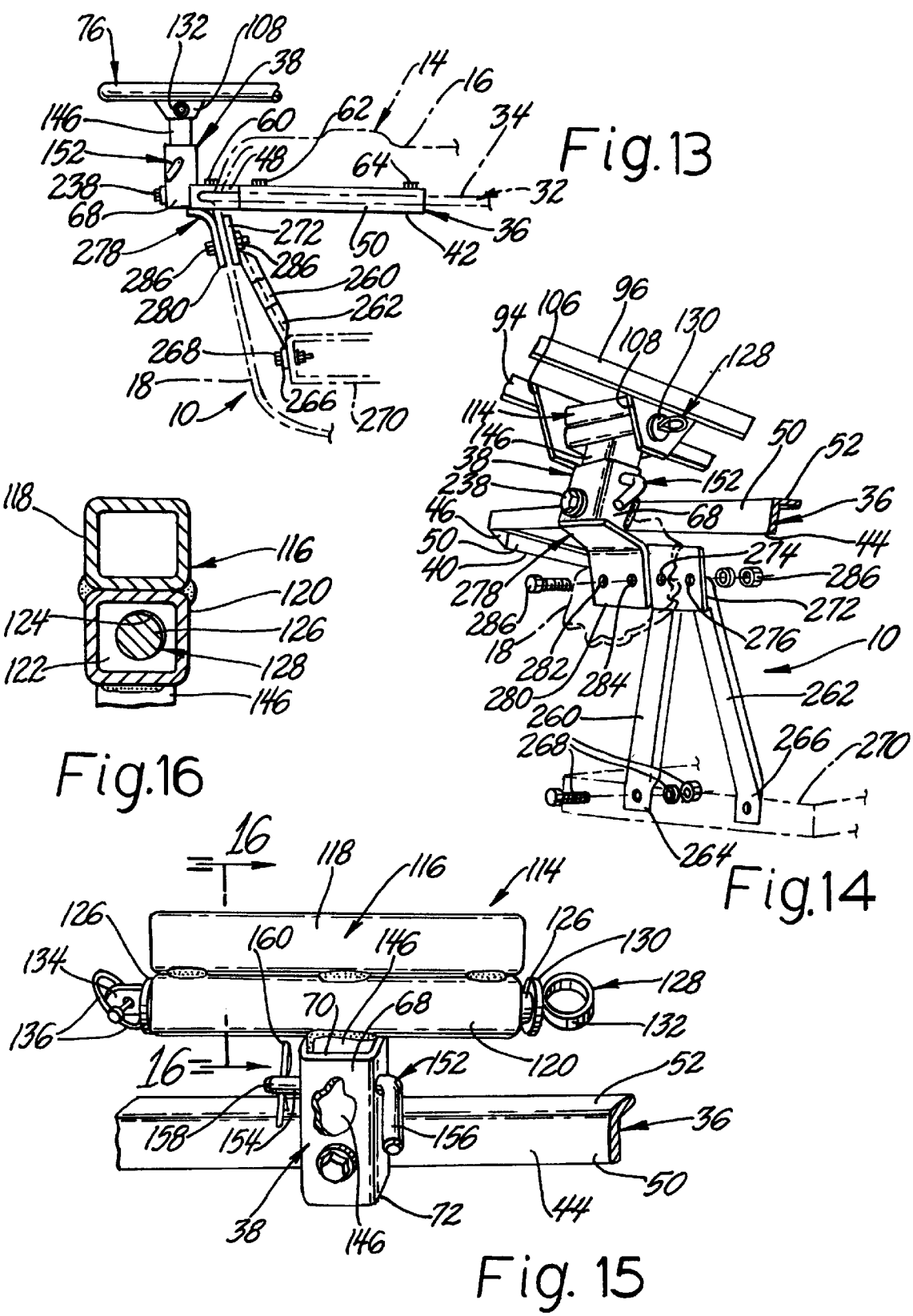

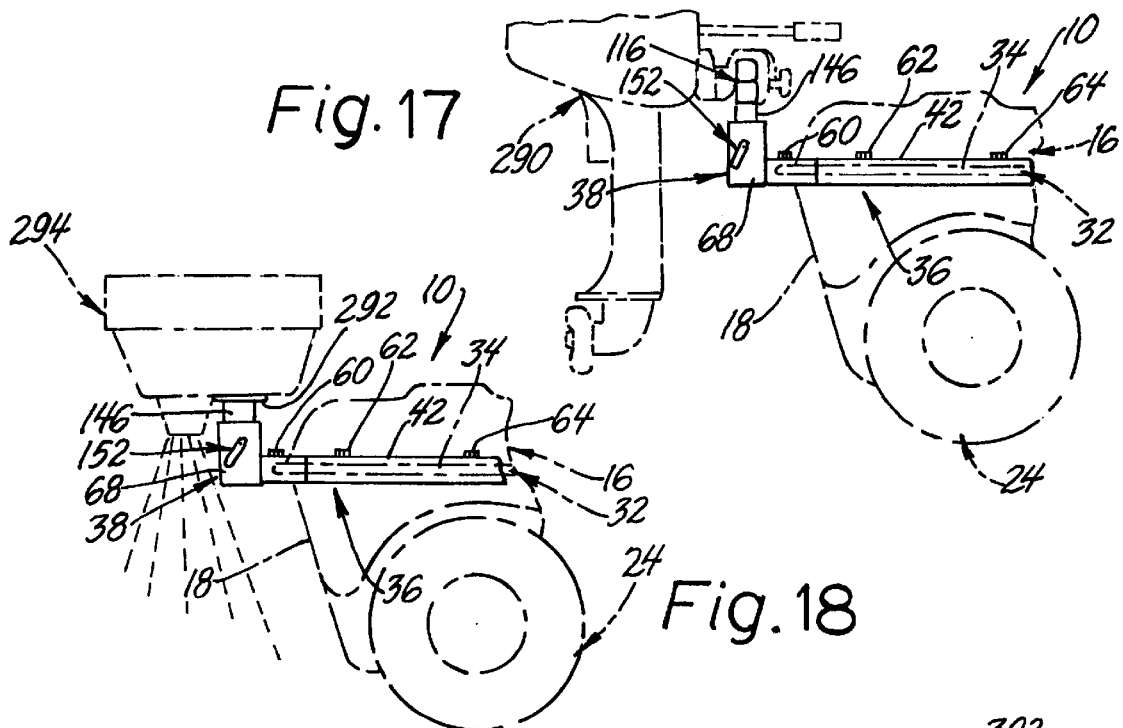
Fig. 17
Fig. 18
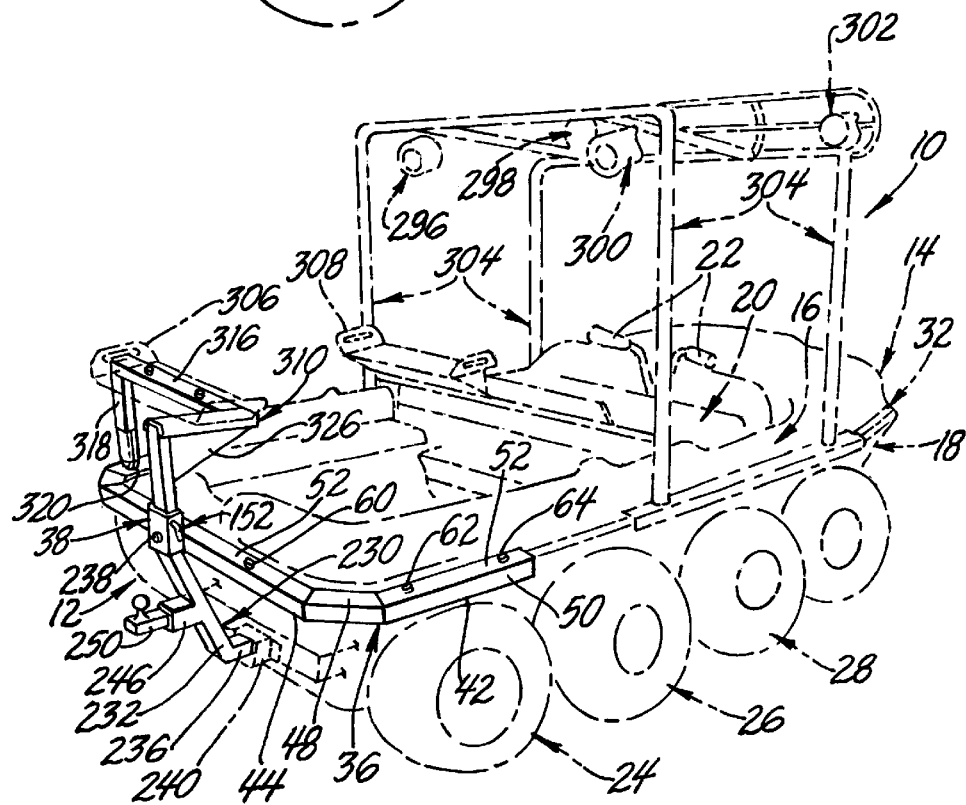
Fig. 19

CARRIER AND CARRIER SYSTEM FOR VEHICLE

FIELD OF THE INVENTION

This invention relates generally to vehicular mounted carriers, and carrier systems, effective for carrying various kinds and types of cargo and more particularly to such carriers, and carrier systems, employed in combination with what may be considered, and often referred-to, as a utility vehicle and/or an all-terrain vehicle and/or recreational vehicle.

BACKGROUND OF THE INVENTION

Heretofore, the prior art has provided various racks or carriers for mounting as onto an all-terrain vehicle for the carrying thereon of selected cargo.

Such prior art structures are limited in their usefulness in that once the prior art structure is secured to an associated vehicle, the resulting configuration is, for all practical purposes, established and continued.

The invention as herein disclosed is primarily directed to providing a carrier or carrier system which, especially compared to the prior art, has an expanded usefulness and is not limited in its configuration and also is concerned with other related and attendant problems of the prior art.

SUMMARY OF THE INVENTION

According to the invention, a carrier system for an associated vehicle comprises a mounting structure for mounting to said vehicle, and wherein said mounting structure comprises coupler apparatus effective for operative connection to support means for supporting goods to be transported by said vehicle.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity, certain details and/or elements may be omitted from one or more views:

FIG. 8 is a relatively enlarged small portion of the structure shown in any of the preceding Figures;

FIG. 9 is a perspective view of the structure of any of the preceding Figures, with such structure shown in an operating position other than that depicted in FIGS. 1–8, and wherein such structure is shown in combination with a further cooperating element such as a box-like container;

FIG. 10 is a fragmentary but relatively enlarged view of one of the elements shown in FIG. 9;

FIG. 13 is a generally side elevational view, similar for example to that of FIG. 6, depicting in fragmentary form structure employing teachings of the invention;

FIG. 14 is a perspective view of the structure of FIG. 13 with some of the elements shown in exploded fashion;

FIG. 15 is an enlarged fragmentary view of at least portions of structures shown in any of FIGS. 1–7, 9, 13, 14, 17, 18, 19 and 20;

FIG. 16 is a cross-sectional view taken generally on the plane of line 16—16 of FIG. 15 and looking in the direction of the arrows;

FIG. 17 is a view similar to that of FIG. 13 and further depicting structure employing teachings of the invention;

FIG. 18 is a view similar to that of, for example, FIGS. 13 and 17 and also further depicting structure employing teachings of the invention;

FIG. 19 is a view generally similar to that of, for example, FIG. 1 depicting a further form or embodiment of structure employing teachings of the invention.

DETAILED DESCRIPTION OF THE PREFERRED EMBODIMENTS OF THE INVENTION

Figure 1:
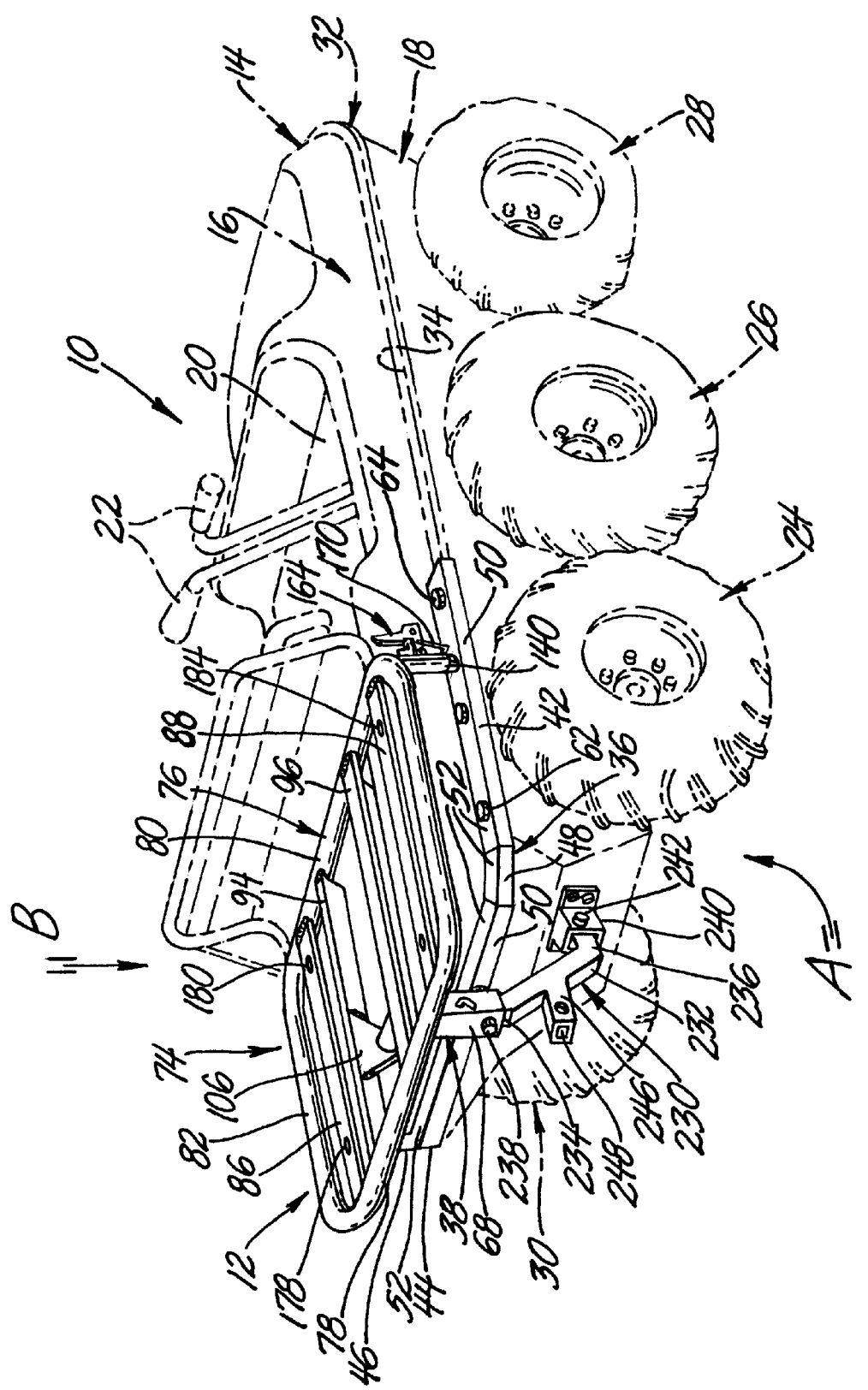
FIG. 1 is a perspective view of a vehicle with a carrier and carrier system employing teachings of the invention.

Referring now in greater detail to the drawings, FIG. 1 depicts a vehicle 10 in combination with a carrier and carrier system 12 employing teachings of the invention. The vehicle 10 may be an all-terrain vehicle (ATV) which may be amphibious.

As shown, the vehicle 10 may be comprised of a body structure 14 having generally relatively upper and lower body or housing portions 16 and 18 with a passenger receiving opening or cockpit 20 formed generally by the upper body 16. Various vehicular engine and brake control members, as are for example well known in the art, as well as a vehicular steering control means 22 may be situated as to be accessible, generally within the cockpit 20, by an operator of the vehicle 10.

The vehicle 10 is provided with suitable engine propulsion means (not shown but well known in the art) in turn operatively connected through suitable drive means as to a plurality of terrain engaging wheel assemblies 24, 26, 28 and 30 along with wheel assemblies situated in general axial alignment with wheel assemblies 26 and 28 and on the same side of the body structure 14 as is wheel assembly 30.

In the embodiment of FIG. 1 the body structure 14 is formed as by a juncture 32 of the upper 16 and lower 18 body or housing portions or sections. As generally depicted, the juncture 32 may extend peripherally of the body structure 14 and, in so doing, provide a generally upper disposed accessible surface 34.

As shown in FIGS. 1, 2, 3, 4, 5, 6 and 7 the carrier system 12, at the rearward portion of the body structure 14, comprises a mounting structure 36 and coupler 38. In the preferred embodiment the mounting means or structure 36 is fabricated of sections of angle iron or steel welded together as to form side members or portions 40 and 42 an end member or portion 44 and corner members or portions 46 and 48. Each of such members or portions 40, 42, 44, 46 and 48 is preferably provided with a downwardly directed abutment or wall portion 50 and an integrally formed generally horizontally extending upper abutment or wall portion 52.

Although other securing means may be employed, in the preferred embodiment, as of FIGS. 1–7, the mounting means or structure 36 is secured to the associated vehicle 10 as by bolts 54, 56, 58, 60, 62 and 64 extending through the frame-like structure 36 and into and/or through an accommodating portion of the vehicle 10 as, in the depicted preferred embodiment, through the body juncture 32 thereby fixedly holding the upper abutment or wall portion 52, of the frame-like mounting member 36 against the cooperating mounting surface 34 of the body juncture 32. In the preferred embodiment of FIGS. 1–7, when the frame-like mounting means 36 is thusly brought into secured engagement with the vehicle body 10, the generally downwardly depending walls 50–50 thereof serve as locating abutment means as against the outer peripheral surface of juncture 32 and further enhance the strength and rigidity of the overall mounting means 36.

In the preferred embodiment, the coupler 38 is provided with a receiving or coupling opening 66 which, preferably, is keyed as to more easily and assuredly correctly receive therein coacting coupling means of associated structure. In the embodiment of FIGS. 1–7, such coupling or receiving opening 66 may be considered as being of generally right rectangular or square cross-sectional configuration and the body or housing 68 of the coupler 38 may be of similar configuration and, further, the receiving opening 66 may extend entirely through the housing 68 from what may be termed the housing or coupler upper end 70 to the coupler lower end 72.

In the embodiment of FIGS. 1–7, a preferably generally open form of carrier or rack 74 is operatively connected to and supported by the coupler 38. Referring for example to FIGS. 1–7, the rack 74 is depicted as comprising a generally peripheral main member 76 formed as into a rectangular configuration so as to have first oppositely disposed leg or bar-like portions 78 and 80 and second oppositely disposed leg or bar-like portions 82 and 84 with portions 82 and 84 integrally joined to portions 78 and 80.

Figure 2:
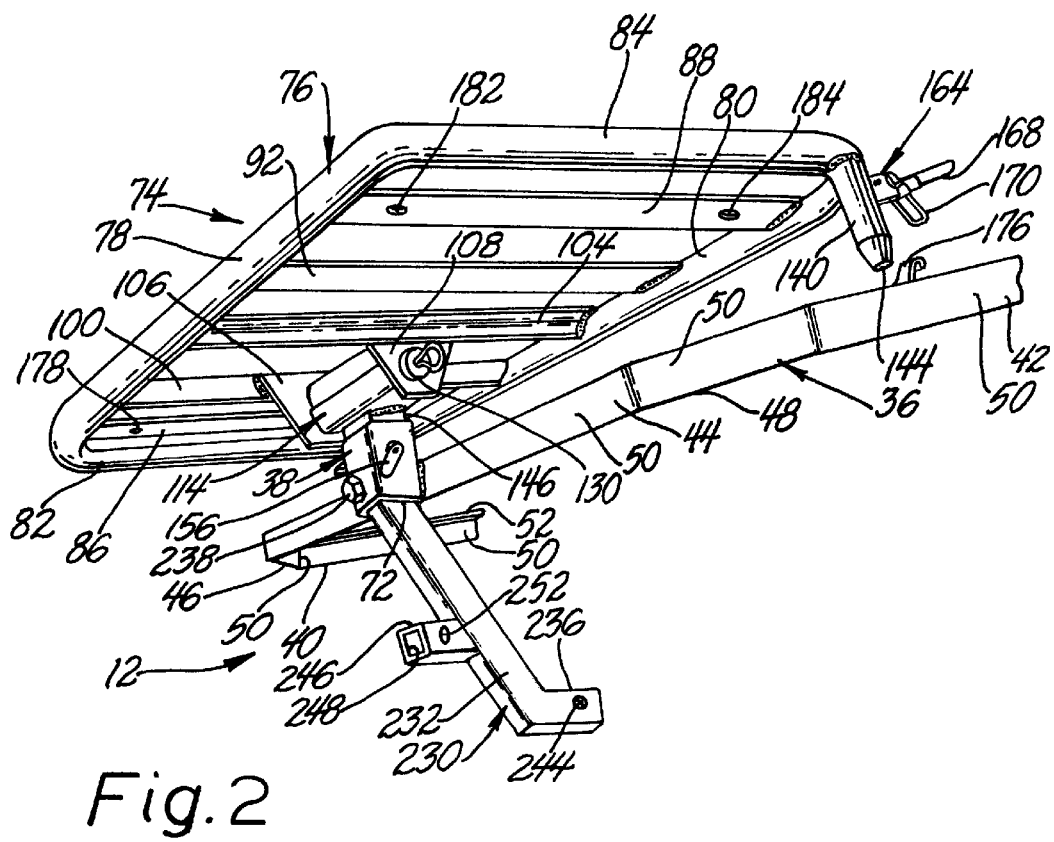
FIG. 2 is a relatively enlarged perspective view, of a portion of the inventive structure of FIG. 1, taken generally in the direction of arrow A in FIG. 1.
Figure 4:
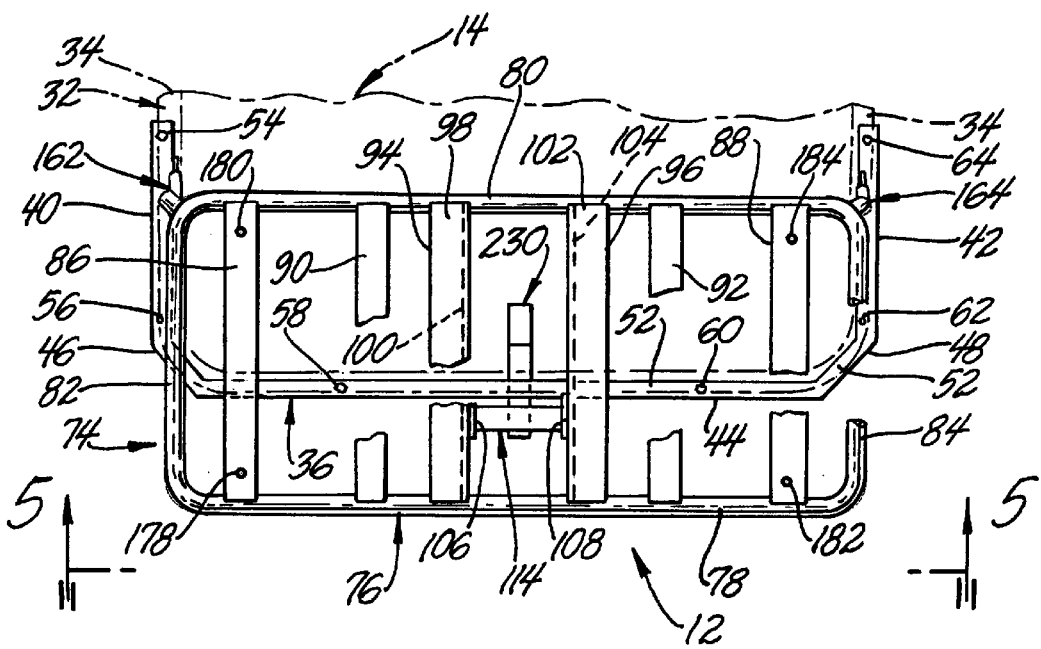
FIG. 4 is a generally top plan view taken generally in the direction of arrow B in FIG. 1.

In the preferred embodiment of the carrier 74, a plurality of generally transverse support members 86 and 88, as depicted in FIG. 1, are oppositely welded to bar-like or leg portions 78 and 80. Of course, as shown in FIGS. 2 and 4, additional transverse support members 90 and 92 may be provided.

In the preferred embodiment, the rack or carrier 74 further comprises a pair of transverse angle type support members 94 and 96 which also may be oppositely welded to peripheral leg or bar-like portions 78 and 80. Support member 94 is depicted as comprising a generally laterally extending support body portion 98 integrally formed with a downwardly depending (as viewed in FIGS. 2, 4 and 5) wall portion 100 preferably disposed at a right angle to body portion 98. Similarly, support member 96 is depicted as comprising a generally laterally extending support body portion 102 integrally formed with a downwardly depending wall portion 104 preferably disposed normal to body 102.

Figure 3:
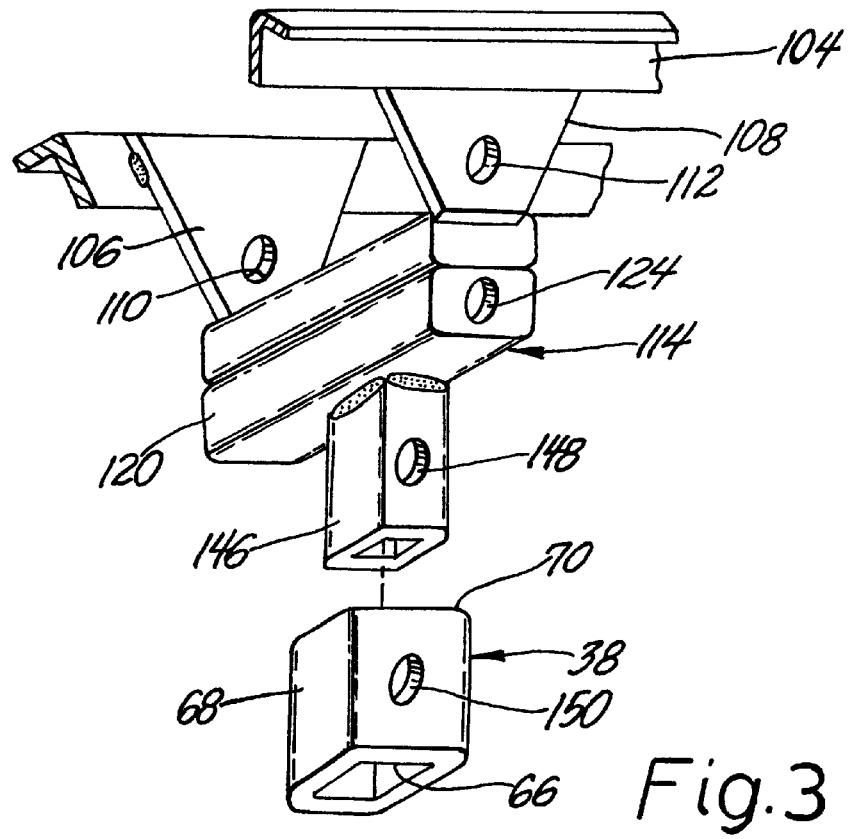
FIG. 3 is a fragmentary portion of the structure of FIG. 2 shown in a generally perspective and somewhat exploded view.

As possibly best seen in FIGS. 1, 2, 3, 5, 6 and 7, the rack or carrier 74 preferably also comprises mounting plates or members 106 and 108 for the pivotal mounting of the carrier 74 with such plates being respectively fixedly secured to members 94 and 96 as by welding. Such plates or members 106 and 108 are shown in FIG. 3 with respective apertures 110 and 112 formed therethrough. These apertures, as should be apparent, cooperate with pivot means 114 for operative pivotal connection to at least the structure 12 as of FIGS. 1, 5, 6 and 7.

Referring primarily to FIGS. 15 and 16, the pivot means 114, in its preferred embodiment, may be considered as comprising a generally relatively upwardly situated pivot body or housing 116 which, in turn, may be formed, for example, as by stacked square fabricating members or conduit portions 118 and 120 which, as depicted, may be welded to each other. In the embodiment depicted, body 120 is provided as with suitable journal means 122 which, in turn, is provided with axially extending passage means 124 for slidably receiving therethrough a related extension or engaging portion 126 of a pivot 128. The pivot 128 may be comprised of a generally circular flange portion 130, as at a first functional end, and an annular portion 132 by which the extension or cylindrical pivot engaging portion 126 may be manually withdrawn from passage 124. The other end of the pivot 128 may be flatted as at 134 and provided as with an aperture or passage for the reception therethrough of suitable cotter pin or other retainer means and the like 136.

When the pivot means 114 is operatively connected as to the carrier 74 of FIGS. 1, 2, 4, 5, 6 and 7 the pivot body or housing 116 is positioned between pivot plate members 106 and 108 as to have pivot housing 116 passage 124 aligned with respective passages or apertures 110 and 112 of pivot plates or members 106 and 108 and, at that time, the pivot member 128 is serially inserted through aperture 112, then passage 124 and then through aperture 110. This then causes the plates or members 106 and 108 to be pivotally mounted against or on cylindrical pivot body 126, with plate or member 106 being axially between the suitable retainer means 136 and the juxtaposed end of housing member 120, and with plate 108 being journaled on pivot body 126 and axially between the opposite end of housing member 120 and flange portion 130.

The pivot means 114, as depicted for example in FIGS. 2, 3, 5, 6, 7, 15 and 16, preferably comprises an extension portion or member 146 welded to body 120 and effective for operative connection to the coupler means 38. In the preferred embodiment, the extension or extender 146 is slidably receivable in passage or opening 66 of coupler means 38. Further, in its preferred embodiment, the extension 146 is provided with transverse through passage means 148, and, similarly, the coupler means 38 is provided with transverse through passage means, 150. When the extension 146 and coupler body 68 are operatively connected to each other, passages 148 and 150 may be brought into functional alignment enabling the reception of and insertion therethrough of suitable locking means 152 which, as possibly best seen in FIG. 15, may take the form of a steel pin 154 having one end formed into a handle-like portion 156 and its other end 158 provided as with a clearance cross-passage for the operative reception of a cotter-pin 160 thereby preventing the unintentional removal of the lock pin 154 from members 146 and 68.

Figure 6:
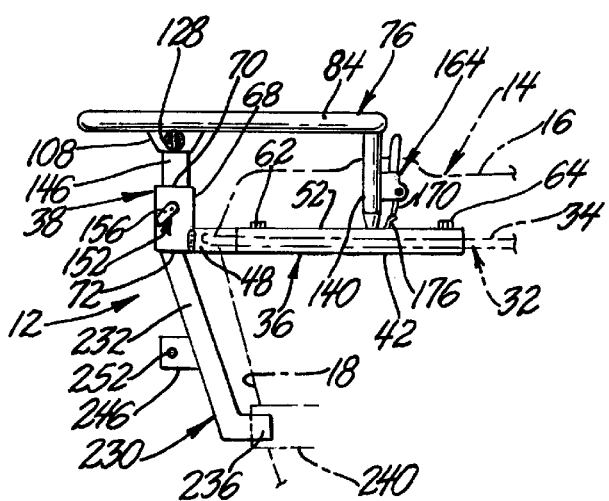
FIG. 6 is an elevational view taken generally on the plane of line 6—6 of FIG. 5 and looking in the direction of the arrows.
Figure 7:
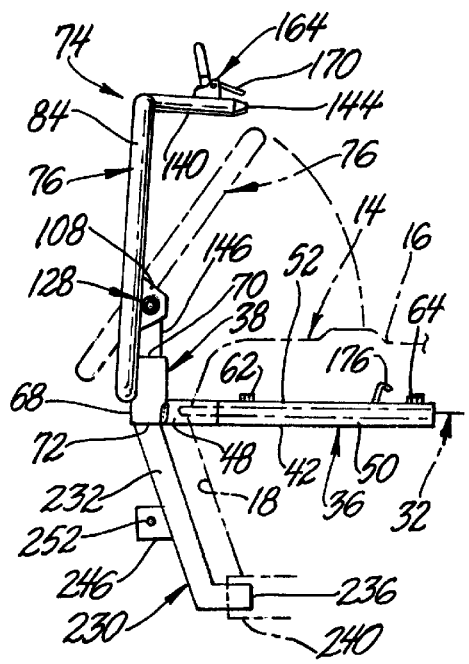
FIG. 7 is a view similar to that of FIG. 6 but, instead, depicting one of the elements thereof in a different operating position.

The pivot means 114, being pivotally secured to the rack or carrier structure 76, when received by the coupler means 38 enables the rack 76 to experience pivotal movement relative to the coupler 38 and vehicle 10 as generally depicted in FIGS. 6 and 7.

The rack 74, in its preferred embodiment, comprises suitable stop or abutment means effective for positioning the rack in its desired and proper relationship with respect to the associated vehicle 10. Such abutment means may take the form of leg-like portions or members 138 and 140 secured to and carried as by the generally peripheral means 76. In the depicted embodiment, the axial lengths of such leg members 138 and 140 are that which will provide for the carrier 76 being in a desired position, relative to the associated vehicle 10, as when the ends 142 and 144 of legs or abutments 138 and 140 engage, for example, the mounting member 36.

Figure 5:
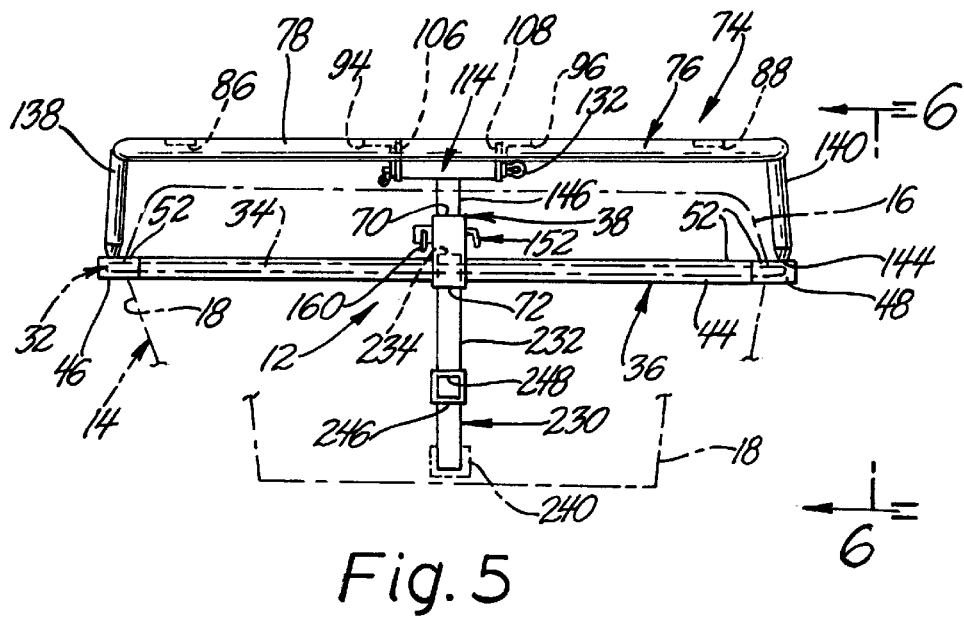
FIG. 5 is a view taken generally on the plane of line 5—5 of FIG. 4 and looking in the direction of the arrows.

Also, in the preferred embodiments, hold-down means are provided in order to hold the carrier 76 in its selected down position or condition as depicted, for example, in FIGS. 1, 5 and 6. Although various forms of hold-down means are available, in the preferred embodiment such hold-down means are comprised of clamp-like or toggle assemblies 162 and 164 respectively secured to and carried as by legs 138 and 140. Each of the toggle clamping assemblies, as typically depicted by 162 of FIG. 8, may be comprised of a mounting body or housing 166, by which the entire assembly 162 is mounted onto the leg 138, and a manually operable lever arrangement 168 pivotally carried by the body 166 and operatively connected to a cooperating bail or loop member 170. Many forms of toggle clamping assemblies are well known in the art and the practice of the invention is not limited to any particular embodiment. However, as is generally well known in the art, as the lever 168 is swung, in the direction of arrow 174, to the lock position at 169, the loop member 170 moves toward and into operative engagement, as depicted in phantom line at 171, with a cooperating latch member 176 operatively and suitably secured to the mounting structure 36.

The invention provides for adaptability of configuration as to meet the then existing needs. For example, in the preferred embodiment of the rack 76, apertures or clearance passages 178 and 180 are formed in transverse support member 86 while apertures or clearance passages 182 and 184 are formed in transverse support member 88. A cargo carrying box or container means 186 may then be detachably secured to the rack 76 by employing such apertures or passages 178, 180, 182 and 184.

In the preferred embodiment, the container or box-like structure 186, as depicted in FIGS. 9, 10, 11 and 12, is comprised of a base, bottom or floor 188 with corner posts or supports 190, 192, 194 and 196 and first generally upstanding wall means 198 extending between posts or supports 190 and 192, second generally upstanding wall means 200 extending between posts or supports 192 and 194, and third generally upstanding wall means 202 extending between posts or supports 196 and 190. The cargo container 186 is shown operatively connected to and secured as by a plurality of screw or bolt members 204, 206, 208 and 210 respectively extending through the floor or base 188 and a juxtaposed support member. More particularly, such fastening means may be considered as generally typically depicted in FIG. 10 wherein, in relatively enlarged cross-sectional view, the screw or bolt 204 extends through one of a plurality of clearance passages 212 and, in this depiction, clearance passage 184 of transverse support member 88. Each of the bolts or screws 204, 206, 208 and 210 is provided with a head-like portion 214 which operatively abuts against floor 188 and respective suitable wing nuts 216 serve to engage the screws 204, 206, 208 and 210 to hold the box or container 186 assembled to the rack 76.

Figure 11:
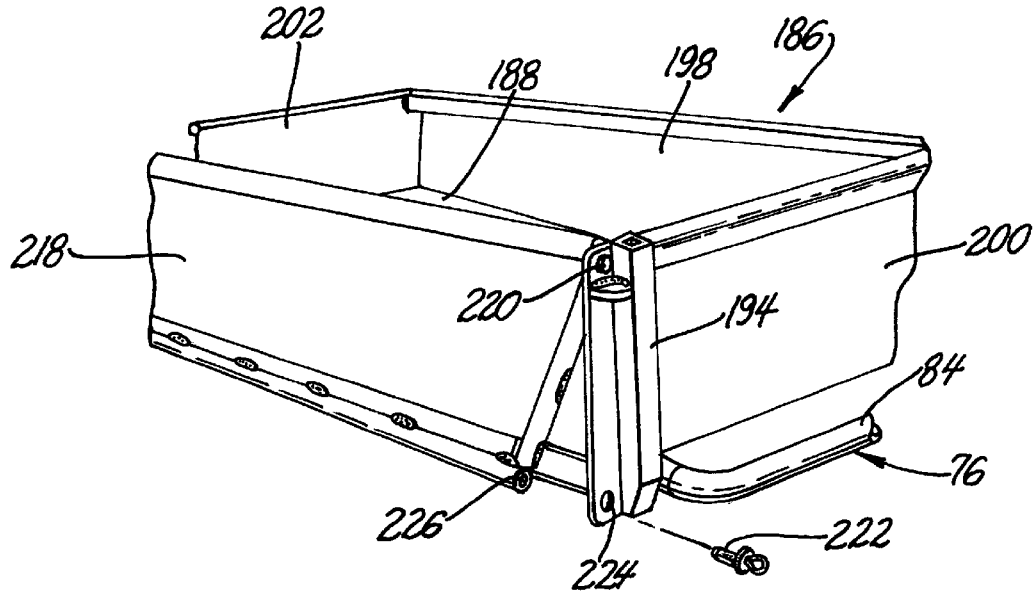
FIG. 11 is a fragmentary perspective view of a cargo container and the like provided as with a pivotally carried gate.
Figure 12:
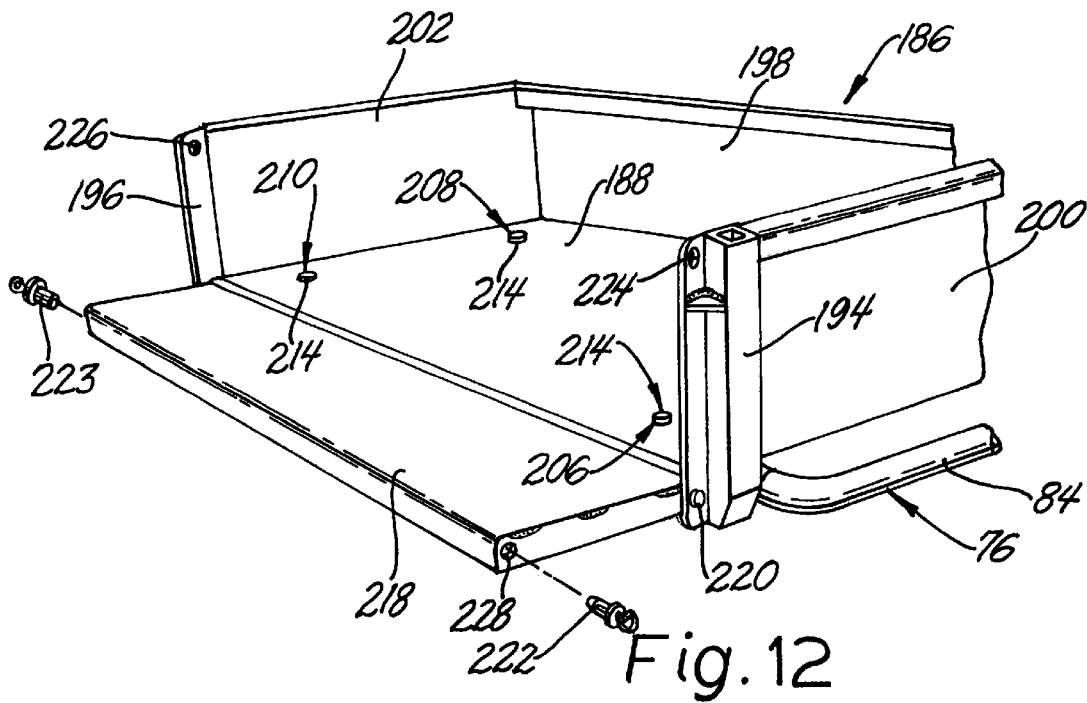
FIG. 12 is a view similar to that of FIG. 11 and illustrating structure similar to that of FIG. 11 but with the gate pivotally supported as at its lower portion.

The container means 186 may have a functionally open or openable wall. FIGS. 11 and 12 depict two of such wall means. Referring in greater detail to the drawings, FIG. 11 depicts, somewhat fragmentarily, an openable wall, door or gate 218 which is shown as pivotally secured by a pivot rod 220, at the upper end of gate 218, to the corner posts as typically represented by post or support 194. Detent-like locking pins or members, one of which is depicted at 222, may be employed to partly pass through clearance passage 224, of post or support 194, and into a cooperating passage way 226, of gate 218, to thereby selectively hold the gate 218 in a closed condition.

FIG. 12 illustrates that the gate means 218 may be re-arranged as to thereby have the gate 218 pivotally mounted at its lower end (as by the coaction of aperture 224, passage 226 and pivot means 220 of FIG. 11) to the corner supports or posts 194 and 196. In the embodiment of FIG. 12 the detent-like locking pins 222 and 223 respectively pass through clearance passages 224 and 226, of corner posts 194 and 196, and into a cooperating passage 228 of gate means 218.

The invention also contemplates that at least at times it may be desired to augment the carrying capability or capacity of the rack or carrier 76. The invention provides for such augmentation. That is, referring in particular to FIGS. 1, 2, 5, 6, 7, 19 and 20, additional generally vertical support means 230 is provided for coaction as between, for example, the vehicle 10 and coupler means 38. In the preferred embodiment, the support means 230 comprises a bar-like member 232 having opposite ends 234 and 236 with upper end 234 being slidably received by the housing or body 68 of coupler means 38. Such upper end 234 may be operatively secured to coupler body 68 as by bolt or securing means 238 passing through aperture or passage means in coupler body 68 and, for example, threadably engaging within a cooperating threaded passage formed in the upper end 234 of the support strut 230. The lower end 236 is slidably received by a cooperating support or anchor member 240, carried by and operatively secured as to the rearward portion of vehicle 10, and may be secured thereto as by suitable bolt, screw or other fastener means 242 passing through aperture or passage means in support or anchor member 240 and, for example, threadably engaging within a cooperating threaded passage 244 in lower end 236.

In the preferred embodiment the support 230 is provided with a projecting portion 246 which may be welded to the member 232 and which is provided as with an opening 248 effective for operatively receiving towing means as, for example, a trailer hitch 250 depicted in FIG. 19. In the preferred embodiment, suitable passage means 252 may be provided through the extension 246 as to permit the insertion therethrough, and into or through associated hitch means 250 and the like, of suitable securing pin means and the like.

FIGS. 13 and 14 illustrate what may be considered as a modification of the support augmentation described with regard to FIGS. 1, 2, 5, 6, 7 and 19.

In the embodiment of FIGS. 13 and 14, the various elements which are like or similar to the elements of any of FIGS. 1–9, 15 and 16 are identified with like reference numbers. In FIGS. 13 and 14 the support augmentation is brought about as by support bars or members 260 and 262 which have their respective lower ends 264 and 266 suitably secured, as by screw means typically depicted at 268, as to suitable structural means 270 carried by or forming a portion of the vehicle 10. Preferably, the upper ends of support members 260 and 262 are welded to a backing or clamping-like plate 272 which is also provided as with a pair of clearance passages 274 and 276. A second backing or clamping-like plate 278 is preferably secured to the body 68 of coupler means 38 as by welding and comprises a bent portion 280 to extend generally downwardly. A pair of clearance passages 282 and 284 are formed through plate portion 280 as to have a spacing as that of passages 274 and 276. The plates 280 and 272 are operatively clamped against vehicle body portion 18 by respective screw type fastener means, one typically depicted at 286, passing through plates 280 and 272, and vehicle body portion 18, and urging the plates 280 and 272 into the clamped condition depicted in FIG. 13.

FIGS. 17 and 18 illustrate the mounting structure 36 of the invention combined with an associated vehicle 10 and effective for carrying cargo in a manner not depicted in any of FIGS. 1–16. FIGS. 17 and 18 are each fragmentary views and all elements shown therein which are like or similar to elements shown in any of FIGS. 1–16 are identified with like reference numbers.

Referring in particular to FIG. 17, the mounting structure 36 of the invention is shown carrying a suitable cargo support which may take the form of a body 116 and extension 146. FIG. 17 depicts that cargo, as for example an outboard motor assembly 290, may be suitably secured to the vehicle 10 through the support body 116, extension 146 and coupler 38. In the embodiment of FIG. 17 the outboard motor assembly 290 is clamped to the support body 116 and, in such a configuration, the outboard motor 290 is also effective for propelling the vehicle 10 through water, i.e., rivers, lakes and the like.

Referring in particular to FIG. 18, the mounting structure 36 of the invention is shown carrying a suitable cargo support which may take the form of a mounting member or plate 292 and operatively connected extension 146. The mounting member or plate 292, which may in fact comprise a portion of extension 146, is suitably secured to cargo 294 which is depicted as being, for example, a spreader of fertilizer.

FIG. 19, in which all elements which are like or similar to those of preceding Figures are identified with like reference numbers, illustrates a vehicle 10 which is provided as with a plurality of lamp assemblies 296, 298, 300 and 302 mounted as on a frame assembly 304. Such may be especially useful in situations wherein the vehicle 10 is employed as an emergency type vehicle for, among other things, carrying a stretcher-like or litter structure in which an injured person may be placed. In the embodiment depicted in FIG. 19, such a stretcher or litter structure would be supported at respective ends as by cradle-like members 306 and 308. In such an arrangement the cradle or support 308 may be relatively forwardly situated and supported by suitable means comprising or carried by the vehicle 10.

Figure 20:
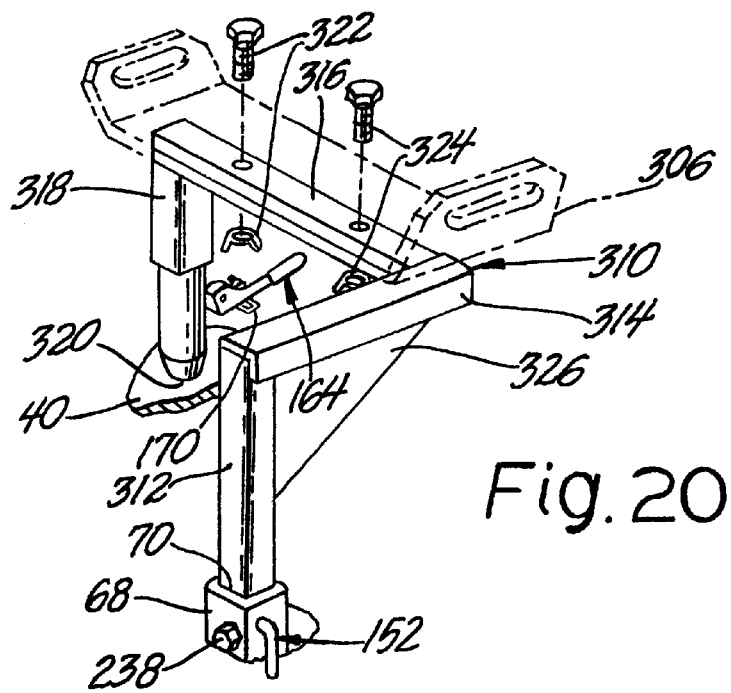
FIG. 20 is a relatively enlarged perspective view of a portion of the structure shown in FIG. 19.

The cradle or support 306 may be secured as to atop a post-like or frame-like support structure 310 shown fragmentarily and in relatively enlarged view in FIG. 20.

Referring in greater detail also to FIG. 20, the support structure 310 is shown as comprising an extension portion 312 to which a member 314 is preferably welded. A laterally extending support arm 316 is preferably welded at its one end to member 314 and has its opposite end suitably secured, as by welding, to a downwardly depending member 318 which may also comprise a foot-like portion 320. When assembled as generally depicted in FIGS. 19 and 20, the toggle clamping means 164 may be actuated as to cause the loop 170 to operatively engage its cooperating hook or anchor, as at 176 of FIG. 2, thereby holding the leg 318 and foot portion 320 against portion 40 of the mounting structure 36. This then assures the continued operational assembly of the support means 310 to the vehicle 10 through the mounting structure 36. The cradle member 306 may be detachably secured to the structure 310 as by threaded fastener means 322 and 324 cooperating with support arm 316. In order to provide for added strength, gussets and the like, as at 326, may be provided.

Even though only preferred embodiments, and selected modifications thereof, have been disclosed and described other embodiments and modifications of the invention are possible within the scope of the appended claims.

What is claimed is:

1. A carrier system for an associated vehicle having a rearwardly situated vehicle portion and a forwardly situated vehicle portion, comprising a mounting structure for mounting to said vehicle, wherein said mounting structure comprises a rearward mounting structure portion and a forward mounting structure portion, wherein said forward mounting structure portion is situated forwardly of said rearward mounting structure portion and physically closer to said forwardly situated vehicle portion, wherein said mounting structure comprises coupler apparatus effective for operative connection to cargo support means for supporting cargo to be transported by said vehicle, and further comprising intermediate connection means for operatively interconnecting said coupler apparatus to said cargo support means, wherein said intermediate connection means is carried by said coupler apparatus, wherein said intermediate connection means comprises a first intermediate connection body portion operatively carried by said coupler apparatus, a second intermediate connection body portion for operative connection to said cargo support means, pivot means for pivotally interconnecting said cargo support means to said second intermediate connection body portion, wherein said cargo support means comprises a cargo carrier member, wherein said cargo carrier member comprises a rearward cargo carrier member portion and a forward cargo carrier member portion, and journal means carried by said cargo carrier member for pivotal connection with said pivot means whereby said cargo carrier member can be pivotally swingably moved with respect to said mounting structure, wherein said cargo carrier member is able to be pivotally swingably moved to a first extreme position operatively abutting said forward mounting structure portion, wherein when said cargo carrier member is in said first extreme position said forward cargo carrier member portion is generally closest to said forwardly situated vehicle portion, wherein said cargo carrier member is able to be pivotally swingably moved to a second extreme position, wherein when said cargo carrier member is moved to said second extreme position said forward cargo carrier member portion is moved both generally upwardly away from said first extreme position and generally rearwardly as to become rearward of said first extreme position.

2. A carrier system according to claim 1 and further comprising latching means for latching said cargo carrier member against movement away from said first extreme position and toward said second extreme position otherwise made possible by said pivot means.

3. A carrier system according to claim 1 wherein said cargo carrier member has a box-shaped container means detachably secured thereto.

4. A carrier system according to claim 3 wherein said box-shaped container means comprises first and second generally upstanding side walls, a relatively forward located upstanding front wall generally spanning the distance between said first and second side walls, and a relatively rearward wall generally spanning the distance between said first and second side walls, said rearward wall being selectively opened to enhance access to the space generally defined between said side walls and rearwardly of said front wall.

5. A carrier system according to claim 4 wherein said box-shaped container means further comprises a floor portion, and fastener means for operatively engaging said floor portion and securing said box-shaped container means to said cargo carrier member.

6. A carrier system according to claim 1 wherein said coupler apparatus comprises a coupler housing comprising first and second housing ends, a first opening formed in said first housing end, wherein said first opening is effective for receiving a support connector effective for supporting said cargo, and wherein said first opening is formed in said first housing end at a generally lower portion thereof.

7. A carrier system according to claim 6 and further comprising additional latching means for detachably holding said support connector in assembled relationship to said coupler housing.

8. A carrier system according to claim 7 wherein said additional latching means comprises a first passage formed through said coupler housing, wherein said additional latching means further comprises a second passage formed through said support connector, and mechanically positive locking means for passing through said first and second passages for operatively positively locking said support connector to said coupler housing.

9. A carrier system according to claim 2 and further comprising stop means for stopping the swingable pivotal movement of said cargo carrier member at a preselected position as said cargo carrier member swingably pivotally moves toward said mounting structure, and wherein said preselected position defines said first extreme position.

10. A carrier system according to claim 9 wherein said stop means comprises abutment means carried by said cargo carrier member and effective to operatively abut against said mounting structure as said cargo carrier member moves toward said mounting structure.

11. A carrier system according to claim 1 wherein said mounting structure further comprises abutment means carried by said mounting structure and extending as to abut against portions of said vehicle for thereby assisting in the location of said mounting structure onto said vehicle.

12. In combination, a vehicle, a carrier system for said vehicle, wherein said vehicle comprises a vehicular body, wherein said vehicular body comprises a relatively lower vehicular body, a relatively upper vehicular body, wherein said vehicular body comprises a generally left side body portion, wherein said vehicular body comprises a generally right side body portion, wherein said vehicular body comprises a generally rearwardly disposed rearward body portion, wherein said carrier system comprises a mounting structure for mounting onto said vehicle, wherein said mounting structure comprises generally laterally extending mounting surface structure for operative connection to said vehicular body, wherein said laterally extending mounting surface structure comprises a left side mounting structure portion operatively engaged to said left side body portion, wherein said laterally extending mounting surface structure comprises a right side mounting structure portion operatively engaged to said right side body portion, wherein said laterally extending mounting surface structure comprises a rearward mounting structure portion operatively engaged to said rearward body portion, and further comprising coupler apparatus operatively carried by said rearward mounting structure portion, wherein said coupler apparatus comprises a coupler housing, wherein said coupler housing comprises an upper housing opening for reception of cargo support means for supporting cargo to be transported by said vehicle, and further comprising support bracing means for supporting said coupler housing, wherein said coupler housing comprises a lower housing opening, wherein said support bracing means comprises a first upper bracing portion for connection to said coupler housing to provide upward support of said coupler housing, and wherein said support bracing means comprises a second relatively lower bracing portion for connection to said vehicular body at an elevation below that of said rearward mounting structure portion.

13. In combination, a vehicle, a carrier system for said vehicle, wherein said vehicle comprises a vehicular body, wherein said vehicular body comprises a relatively lower vehicular body, a relatively upper vehicular body, wherein said vehicular body comprises a generally left side body portion, wherein said vehicular body comprises a generally right side body portion, wherein said vehicular body comprises a generally rearwardly disposed rearward body portion, wherein said carrier system comprises a mounting structure for mounting onto said vehicle, wherein said mounting structure comprises generally laterally extending mounting surface structure for operative connection to said vehicular body, wherein said laterally extending mounting surface structure comprises a rearward mounting structure portion operatively engaged to said rearward body portion, and further comprising coupler apparatus operatively carried by said rearward mounting structure portion, wherein said coupler apparatus comprises a coupler housing, wherein said coupler housing comprises an upper housing opening for reception of cargo support means for supporting cargo to be transported by said vehicle, and further comprising support bracing means for supporting said coupler housing, wherein said coupler housing comprises a lower housing opening, wherein said support bracing means comprises a first relatively upper bracing portion for connection to said coupler housing to provide generally upward support of said coupler housing, and wherein said support bracing means comprises a second relatively lower bracing portion for connection to said vehicle body at an elevation below that of said rearward mounting structure portion.

14. A carrier system for an associated vehicle, comprising a mounting structure for mounting to said vehicle, wherein said mounting structure comprises coupler apparatus effective for operative connection to cargo support means for supporting cargo to be transported by said vehicle, intermediate connection means for operatively interconnecting said coupler apparatus to said cargo support means, wherein said intermediate connection means is carried by said coupler apparatus, wherein said intermediate connection means comprises a first intermediate connection body portion operatively carried by said coupler apparatus, a second intermediate connection body portion for operative connection to said cargo support means, pivot means for pivotally interconnecting said cargo support means to said second intermediate connection body portion, wherein said cargo support means comprises a cargo carrier member, journal means carried by said cargo carrier member for pivotal connection with said pivot means whereby said cargo carrier member can be swingably moved with respect to said mounting structure, wherein said vehicle comprises a vehicular body, wherein said coupler apparatus comprises a coupler housing, and further comprising support bracing means for supporting said coupler housing, wherein said coupler housing comprises a lower housing opening, wherein said support bracing means comprises a first relatively upper bracing portion for connection to said coupler housing to provide generally upward support of said coupler housing, and wherein said support bracing means comprises a second relatively lower bracing portion for connection to said vehicular body at an elevation below that of said rearward mounting structure portion.

* * * * *